United States Patent
Baltatu et al.

(10) Patent No.: US 8,626,678 B2
(45) Date of Patent: Jan. 7, 2014

(54) ANOMALY DETECTION FOR LINK-STATE ROUTING PROTOCOLS

(75) Inventors: Madalina Baltatu, Turin (IT); Sebastiano Di Paola, Turin (IT); Dario Lombardo, Turin (IT)

(73) Assignee: Telecom Italia S.p.A., Milan (IT)

( * ) Notice: Subject to any disclaimer, the term of this patent is extended or adjusted under 35 U.S.C. 154(b) by 630 days.

(21) Appl. No.: 12/811,048

(22) PCT Filed: Dec. 28, 2007

(86) PCT No.: PCT/IT2007/000930
§ 371 (c)(1),
(2), (4) Date: Jun. 28, 2010

(87) PCT Pub. No.: WO2009/084053
PCT Pub. Date: Jul. 9, 2009

(65) Prior Publication Data
US 2010/0287128 A1    Nov. 11, 2010

(51) Int. Cl.
*G06F 15/18* (2006.01)

(52) U.S. Cl.
USPC ............................................. 706/12; 370/230

(58) Field of Classification Search
USPC .......................................................... 706/12
See application file for complete search history.

(56) References Cited

U.S. PATENT DOCUMENTS

2003/0159069 A1* 8/2003 Choi et al. .................... 713/201

OTHER PUBLICATIONS

Wang, Y.; Wong, J.; Miner, A.; , "Anomaly intrusion detection using one class SVM," Information Assurance Workshop, 2004. Proceedings from the Fifth Annual IEEE SMC , vol., No., pp. 358-364, Jun. 10-11, 2004.*
Brown, Michael PS, et al. "Support vector machine classification of microarray gene expression data." University of California, Santa Cruz, Technical Report UCSC-CRL-99-09 (1999).*
International Search Report and Written Opinion dtd Dec. 8, 2008, PCT/IT2007/00930.
Jou Y. F. et al., "Design and implementation of a scalable intrusion detection system for the protection of network infrastructure," DARPA Information Survivability Conf. and Exposition, 2000. Disce X '00. Proceedings Hilton Head, SC, Jan. 25-27, 2000, Las Alamitos, CA, IEEE Comput. Soc, US, vol. 2, Jan. 25, 2000, pp. 69-83.

(Continued)

*Primary Examiner* — Jeffrey A Gaffin
*Assistant Examiner* — David H Kim
(74) *Attorney, Agent, or Firm* — Banner & Witcoff, Ltd.

(57) ABSTRACT

Disclosed herein is an anomaly detection method for link-state routing protocols, a link-state routing protocol providing for link-state update (LSU) messages to be exchanged between nodes in a packet-based network, wherein each link-state update message includes link-state advertisement (LSA) message(s) each having a respective header. The method comprises monitoring the link-state advertisement messages exchanged in the network, extracting and forming respective feature vectors with the values in the fields of the headers of the monitored link-state advertisement messages, and detecting an anomaly related to routing based on the feature vectors. In particular, detecting an anomaly related to routing includes feeding the feature vectors to a machine learning system, conveniently a one-class classifier, preferably a one-class support vector machine (OC-SVM).

8 Claims, 3 Drawing Sheets

(56) References Cited

OTHER PUBLICATIONS

Eskin E. et al., "A Geometric Framework for Unsupervised Anomaly Detection: Detecting Intrusions in Unlabeled Data," Applications of Data Mining in Computer Security, Kluwer Academic Publishers, pp. 1-20 [Online] 2002, http://citeseerx.ist.psu.edu/viewdoc/download-?doi=10.1.1.8.5445&rep=rep1&type=pdf.

He L, "Recent developments in securing Internet routing protocols," BT Technology Journal, Kluwer Academic Publishers, vol. 24, No. 4, Oct. 1, 2006, pp. 180-196.

D. Qu et al., "Statistical Anomaly Detection for Link-State Routing Protocols," Sixth International Conference on Network Protocols, 1998, p. 62.

F. Wang, et al., Design and Implementation of Property-Oriented Detection for Link-State Routing Protocols, in Proceedings of the 2001 IEEE Workshop on Information Assurance and Security, US Military Academy, West Point, NY, Jun. 2001, ISBN 0-7803-9814-9 IEEE, pp. 91-99.

S. Kaplantzis, N. Mani, A Study on Classification Techniques for Network Intrusion Detection, presented at the IASTED International Conference on Networks and Communication Systems, Thailand.

* cited by examiner

ANOMALY DETECTION FOR LINK-STATE ROUTING PROTOCOLS

CROSS REFERENCE TO RELATED APPLICATIONS

This is a U.S. National Phase Application under 35 U.S.C. §371 of International Application No. PCT/1T2007/00930, filed Dec. 28, 2007, which was published Under PCT Article 21(2), the entire contents of which are incorporated herein by reference.

TECHNICAL FIELD OF THE INVENTION

The present invention relates in general to anomaly detection for link-state routing protocols.

BACKGROUND ART

As is known, routing protocols are used in packet-switched networks for computer communications and are implemented by every switching node in the network to forward data packets. In the Internet, these nodes are called routers.

There are two main classes of routing protocols: the distance-vector routing protocols and the link-state routing protocols. In a distance-vector routing protocol, such as the Routing Information Protocol (RIP), each node periodically exchanges reachability information with its neighbors, while in a link-state routing protocol, such as the Open Shortest Path First (OSPF) protocol and the Intermediate System to Intermediate System (IS-IS) protocol, connectivity information is passed between the nodes to construct connectivity maps.

In particular, in a link-state routing protocol, each node receives from all the other nodes a map of the connectivity of the network, in the form of a graph showing which nodes are connected to which other nodes, and independently computes the best next hop for every possible destination in the network. This is done by using only a local copy of the map, and without communicating in any other way with any other node. The collection of best next hops forms the routing table for the node.

Link-state routing protocols are commonly used for intra-domain routing, i.e. are exploited to transport routing information among routers of the same routing domain, also known as Autonomous System (AS), which is a region of a network under a single administrative domain.

In OSPF-based Autonomous Systems, each router periodically floods immediate connectivity information to all the other routers in the Autonomous System by means of Link-State Advertisement (LSA) messages enclosed into Link-State Update (LSU) messages. The LSA messages contain the routing information from which each router constructs a consistent view of the network topology, used to correctly route data packets from their source to their-destination.

Anomaly detection is a well known approach to intrusion detection in network and computer security, and is generally based on statistical models computed for the normal behaviour of an object (users, software products or networks), and on the subsequent measure of the distance of the monitored "live" behaviour of the object from the normal one.

Currently, several methods are known in the literature implementing anomaly detection for routing protocols, most of which are based on known statistical approaches, like the so-called Next-generation Intrusion Detection Expert System/STATistical (NIDES/STAT) Intrusion Detection System (IDS) or the so-called Property-Oriented detection approach for OSPF. For a detailed description of these approaches reference may be made to D. Qu, B. Vetter, F. Wang, R. Narayan, S. Wu, Y. Jou, F. Gong, C. Sargor, *Statistical Anomaly Detection for Link-State Routing Protocols*, Sixth International Conference on Network Protocols, 1998, page 62, and respectively to F. Wang, F. Gong, F. S. Wu, H. Qi, *Design and Implementation of Property-Oriented Detection for Link-State Routing Protocols*, in Proceedings of the 2001 IEEE Workshop on Information Assurance and Security, US Military Academy, West Point, N.Y., June 2001, ISBN 0-7803-9814-9 IEEE.

In particular, in *Statistical Anomaly Detection for Link-State Routing Protocols*, a statistical anomaly detection approach for link-state routing protocols is disclosed, which is based on the NIDES/STAT IDS and was mainly tested on simulated insider attacks against Open Shortest Path First (OSPF) protocol.

The NIDES approach to intrusion detection is to construct a short-term statistical profile of the monitored object and to compare it with a long-term profile generated during a previous training session The profiles are basically the probability distributions of several intrinsic object variables, and they are compared using a modified test. Among the variables taken into account for attack detection, there are variables that measure the routing activity intensity (e.g. the volume of OSPF traffic in a time interval), the distribution of OSPF packets type, 3 fields of the Link State Advertisement (LSA), i.e., age, checksum, and sequence number, CPU usage on routers, etc. The fields are examined independently and the values therein are compared individually with respective pre-defined values (from the OSPF protocol standard) to generate one of the following coarse alarms, such as "invalid checksum", "invalid sequence number", "init sequence number", "max sequence number", and "normal". In detail, the comparison is aimed at checking whether the LSA checksum is correct, the LSA age is lower than or equal to the maximum admissible value (standardized in 3600 s), and the LSA sequence number is not equal to a sequence initial number or a maximum sequence number (also standardized).

In *Design and Implementation of Property-Oriented Detection for Link-State Routing Protocols*, a generic protocol analysis is applied to the OSPF, reducing the whole properties space to a significant subset in order to limit the complexity of the task. The OSPF case study is simplified by considering only flat or mono area routing, only point to point networks, and by not taking into account the LSA type 5 messages, used when a router acts as an Autonomous System Border Router (ASBR).

In other network security-related areas, some anomaly detection approaches are known which use machine learning paradigms like traditional binary Support Vector Machines (SVMs) or one-class SVMs.

Specifically, SVMs are a class of machine learning algorithms for classification/regression that are particularly useful for high dimensional-input data with either large or small training sets. SVMs algorithms work by mapping the input feature space into a high-dimensional feature space, and computing linear functions on those mapped features in the high-dimensional feature space.

SVMs are generally trained through supervised learning, in which the best function that relates the output data to the input data is computed, and the goodness of this function is judged by its ability to generalize on new inputs, i.e. inputs which are not present in the training set. For a detailed description of learning methods for SVMs, reference may be made to N. Cristianini, J. Shawe-Taylor, *An Introduction to*

*Support Vector Machines and other kernel-based learning methods*, pp. 93-122, Cambridge University Press, 2000.

In S. Kaplantzis, N. Mani, *A Study on Classification Techniques for Network Intrusion Detection*, presented at the IASTED International Conference on Networks and Communication Systems, Thailand, SVMs are used for detecting intrusions and misbehaviours in TCP/IP networks.

In particular, SVMs are used to perform misused detection, hence to detect known attacks. The SVMs are trained on existent attack data, in particular on the Defense Advanced Research Projects Agency (DARPA) database for IDS evaluation (benchmark created by Lincoln Laboratory of Massachusetts Institute of Technology from 1998 to 0.2000). The features on which these SVMs work are the 41 TCP connection features included in the DARPA database or on a subset of these features. The attacks included in the database are probing attacks, Denial-of-Service (DoS) attacks, user to root access and remote to user access.

Another area in which the use of SVMs was proposed is intrusion detection in wireless ad hoc networks. In this case the intrusion detection functionality is meant to detect anomalous behaviour in network traffic, which also includes routing traffic. Hence, the SVM features also include some routing traffic information: the rate of routing requests and responses received and sent by a node and the number of modifications (such as add, remove, find) performed on the routing tables of each node. For a detailed description of intrusion detection in wireless ad hoc networks, reference may be made to P. Fu, D. Zhang, L. Wang, Z. Duan, *Intelligent Hierarchical Intrusion Detection System for Secure Wireless Ad Hoc Network*, Conference Title: Advances in Neural Networks—ISNN 2005, Second International Symposium on Neural Networks, Proceedings, Part III (Lecture Notes in Computer Science Vol. 3498) Part Vol. 3 p. 482-7 Vol. 3, and to H. Deng, Q.-A. Zeng, D. P. Agrawal, *SVM-based Intrusion Detection System for Wireless Ad Hoc Networks*, in Proceedings of the IEEE Vehicular Technology Conference, October 2003, IEEE 58th Volume 3, Issue, 6-9 October 2003 Page(s): 2147-2151 Vol. 3.

OBJECT AND SUMMARY OF THE INVENTION

The Applicant has noted that all the known methods, and in particular those based on statistical approaches, are aimed at detecting a limited amount of anomalies in the behaviour of link-state routing protocols, and hence normally have a good/reliable behaviour/performance only for those anomalies they are planned to detect.

Therefore, an objective of the present invention is to provide a methodology which can alleviate at least in part the above cited drawbacks, and in particular which allows a large spectrum of anomalies in the behaviour of link-state routing protocols, to be efficiently and reliably detected.

Moreover, the Applicant has noted that all the known methods involve computationally-intensive and time-consuming data pre-processing and analysis.

Therefore, another objective of the present invention is to provide a methodology which allows such a large spectrum of anomalies to be detected without involving computationally-intensive and time-consuming data pre-processing and analysis.

These and other objectives are achieved by the present invention in that it relates to a method, a system, and a computer program for detecting anomalies for link-state routing protocols, as defined in the appended claims.

The present invention is based on the observation that OSPF attacks and, in general, all anomalies in the behaviour of link-state routing protocols affect the contents of the headers of the link-state advertisements, which are messages containing routing information exchanged among routers of the same routing domain, and hence the quintessential information transferred inside a routing domain at a given moment in time.

Therefore, the present invention achieves the first aforementioned objective by monitoring contents of the headers of the LSA messages exchanged in the network, and then detecting an anomaly in the behaviour of the link-state routing protocol based on the contents of the LSA headers, in particular based on the serialized values in all or some of the fields of the headers of all or some of the monitored LSA Messages.

Conveniently, the anomaly detection is based on a machine learning approach, which allows anomalies to be detected without involving computationally-intensive and time-consuming data pre-processing and analysis.

Conveniently, the machine learning approach is based on a one-class classifier, preferably a one-class Support Vector Machine (OC-SVM), trained based on the contents of "positive" LSA headers only, i.e. LSA headers exchanged in the network during a free-of-attacks and free-of-failures training period only.

BRIEF DESCRIPTION OF THE DRAWINGS

For a better understanding of the present invention, preferred embodiments, which are intended purely by way of example and not to be construed as limiting, will now be described with reference to the attached drawings, wherein.

DETAILED DESCRIPTION OF PREFERRED EMBODIMENTS OF THE INVENTION

The following description is presented to enable a person skilled in the art to make and use the invention. Various modifications to the embodiments will be readily apparent to those skilled in the art, and the generic principles herein may be applied to other embodiments and applications without departing from the scope of the present invention. Thus, the present invention is not intended to be limited to the embodiments shown, but is to be accorded the widest scope consistent with the principles and features disclosed herein and defined in the attached claims.

In addition, the present invention is implemented by means of a computer program including software code portions for implementing, when the computer program product is loaded in a memory of a processing system and run thereon, the anomaly detection method described hereinafter.

In the following, for the sake of description simplicity and without losing generality, the present invention will be described with specific reference to the OSPF protocol, remaining clear that the present invention may also be applied to other types of link-state routing protocols.

Figure 1:
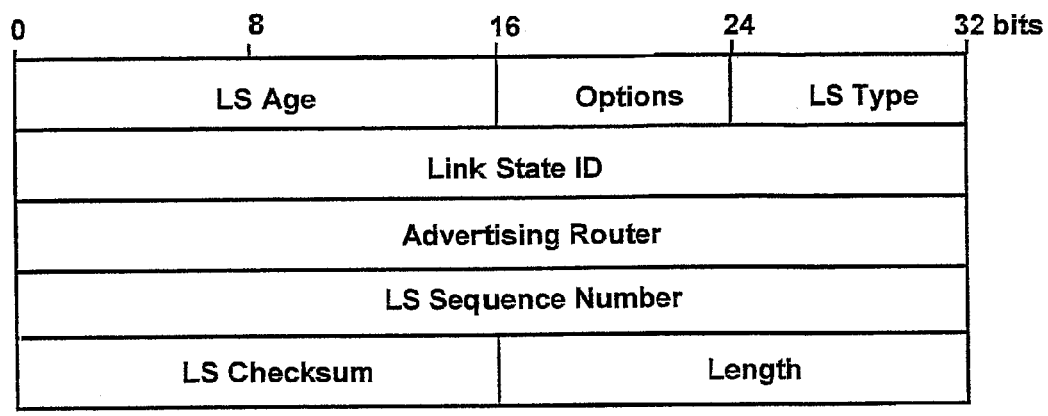
FIG. 1 shows a Link-State Advertisement header.

FIG. 1 shows an LSA header, the binary representation of which is made up of twenty bytes, wherein the first two bytes encode the "LS Age" field, the third byte encode the "Options" field, the fourth byte encodes the "LS Type" field, the fifth, sixth, seventh and eighth bytes encode the "Link State ID" field, the ninth, tenth, eleventh, and twelfth bytes encode the "Advertising Router" field, the thirteenth, fourteenth, fifteenth, and sixteenth bytes encode the "LS Sequence Number" field, the seventeenth and eighteenth bytes encode the "LS Checksum" field, and the nineteenth and twentieth bytes encode the "Length" field.

The Applicant has carried but an extensive investigation on LSA headers during simulated attacks or network failure conditions, and has noted that all or a subset of the fields of LSA headers are altered in presence of anomalies in the routing process due either to attacks or to failures.

Therefore, according to present invention, a large spectrum of anomalies in the behaviour of link-state routing protocols may be efficiently and reliably detected by monitoring the headers of the LSA messages exchanged between the network switching nodes, and by detecting anomalies based on the contents of the LSA headers.

In particular, at a given time, anomaly detection is performed by:
extracting and serializing, i.e. forming respective detection feature vectors, with the values in all or some of the fields of the headers of all or some of the LSA messages exchanged in the network; and
feeding the detection feature vectors to a machine learning algorithm, which detects possible anomalies in the behaviour of the link-state routing protocol.

In particular, the detection feature vectors are fed to a one-class classifier, which is previously trained based on training feature vectors formed with the values in all or some of the fields of the headers of all or some of the LSA messages exchanged between the network switching nodes during a free-of-attacks and free-of-failures training period only.

Accordingly, the one-class classifier, being trained during normal routing conditions, is able to recognize if the LSA headers belong to a normal routing class, i.e. a class containing all possible values of the instances of the LSA headers in normal routing conditions. Therefore, when the one-class classifier doesn't recognize the LSA headers as belonging to the normal routing class, it detects an operating anomaly.

A computationally-efficient and time-saving one-class classifier is a one-class Support Vector Machine (OC-SVM), some mathematical notation relating to which are introduced hereinafter to facilitate understanding of its employment in the present invention.

SVMs were firstly developed by V. Vapnik in *The Nature of Statistical Learning Theory*, Springer-Verlag, New York, 1998, based on a principle known as Structural Risk Minimization from statistical learning theory. They can be applied to regression, classification, and density estimation problems.

Briefly, SVMs belong to the category of maximum-margin classifiers, and they naturally perform binary classification (i.e. they have two output classes), by finding, in the feature space of the SVM, a decision hypersurface (usually a hyperplane) that splits the positive examples from the negative examples, the split being such as to have the largest distances from the hypersurface to the nearest of the positive and negative examples, generally making the classification correct for testing data that is near, but not identical to the training data.

Focusing on classification, SVMs receives as input an independent and identically distributed (i.i.d.) training sample $S=(x_1, y_1), (x_2, y_2), \ldots, (x_n, y_n)$, of size n from a fixed but unknown distribution $Pr(x,y)$ describing the learning task, wherein $x_i$ are vectors representing the input data to be classified (the observations), while $y_i$, typically in the set $\{-1, +1\}$ are the class labels.

In their basic form, SVMs learn binary, linear decision rules in the form:

$$h(x) = \begin{cases} \text{sign}(w \cdot x + b) & \text{if } w \cdot x + b \geq 0 \\ -1 & \text{otherwise} \end{cases}$$

Figure 2:
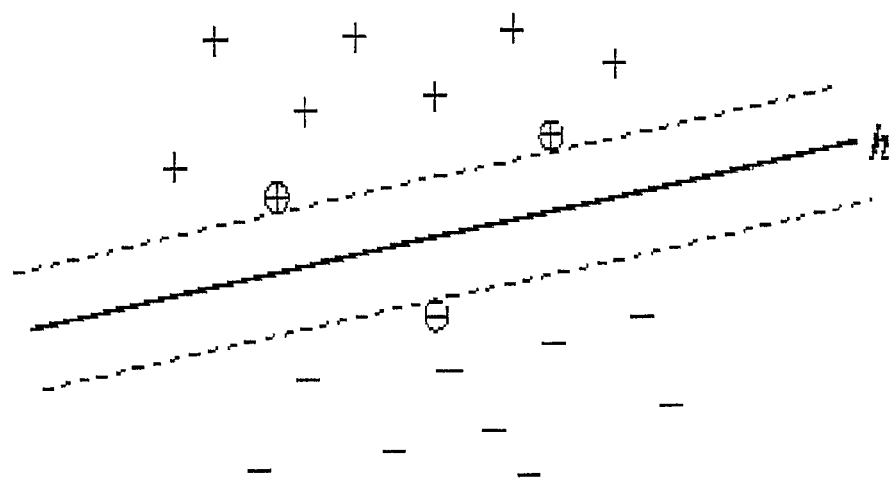
FIG. 2 shows a hyperplane, separating positive and negative training examples, and support vectors in a high-dimensional feature space of an SVM.

The decision function, also known as hypothesis, is described by a weight vector w and a threshold b. According to which side of the hypersurface the input vector x lies on, it is classified into class +1 or −1. The idea of structural risk minimization is to find a hypothesis h for which the lowest error probability can be guaranteed. With SVMs, Vapnik showed that this goal can be translated into finding the hypersurface with largest margin for separable data. In other words, for separable training sets, SVMs find the hypersurface h, which separates the positive and negative training examples, marked with "+" and "−", respectively, in FIG. 2, with largest margin. The examples closest to the hypersurface h are called support vectors, marked with circles in FIG. 2.

Computing the hypersurface is equivalent to solving the following quadratic optimization problem in the Lagrangian representation (for more details reference may be made to N. Cristianini, J. Shawe-Taylor, *An Introduction to Support Vector Machines and other kernel-based learning methods*, Cambridge University Press, 2000, pp. 93-122):

$$\text{minimize } W(\alpha) = -\sum_{i=1}^{n} \alpha_i + \frac{1}{2} \sum_{i=1}^{n} \sum_{j=1}^{n} y_i y_j \alpha_i \alpha_j x_i x_j$$

$$\text{subject to } \sum \alpha_i y_i = 0, \forall \alpha_i, 0 \leq \alpha_i \leq C, i = 1, \ldots, n$$

Support vectors are those training vectors $x_i$ corresponding to positive Lagrangian coefficients $\alpha_i > 0$. From the solution of this optimization problem the decision rule can be computed as:

$$w \cdot x = \Sigma \alpha_i y_i x_i x \text{ and } b = y_{tsv} - w \cdot x_{tsv}$$

The training example $(x_{tsv}, y_{tsv})$ for calculating b must be a support vector with $\alpha_{tsv} < C$.

For both solving the quadratic optimization problem as well as applying the learned decision rule, it is sufficient to be able to calculate inner products between observation vectors. Exploiting this property, the use of kernel functions, denoted by $K(x_1, x_2)$, was introduced for learning non-linear decision rules. Such kernel functions calculate an inner product in some high-dimensional feature space and replace the inner product in the formulas above.

Popular kernel functions are linear, polynomial, Radial-Basis Function (RBF), and sigmoid:

$$K_{lin}(x_i, x_j) = x_i \cdot x_j$$

$$K_{poly}(x_i, x_j) = (x_i \cdot x_j + 1)^p$$

$$K_{rbf}(x_i, x_j) = \exp(-(x_i - x_j)^2 / s^2)$$

$$K_{sig}(x_i, x_j) = \tan h(s(x_i \cdot x_j) + c)$$

Therefore, depending on the type of the kernel function, SVMs can be linear classifiers, polynomial classifiers, radial basis function (RBF) classifiers, or two-layer sigmoid neural networks.

In OC-SVMs (One-Class Support Vector Machines) the support vectors characterizing the object's class are obtained only from positive training examples. In particular, such support vectors define a hypersphere that encloses all possible representations of the object. All observations (input vectors) lying outside this hypersphere are considered not correct or anomalous representations.

The problem the OC-SVM has to solve is the estimation of a model function h(x, w) which gives a closed boundary around the target class data (reference may for example be made to D. M. J. Tax, *One-class classification*, Concept learning in the absence of counter examples, Ph.D. thesis, Technical University of Delft, 2001). This closed boundary is a hypersphere that contains all the training objects $X^{tr}$, and that is characterized by a center a and a radius R, as illustrated in FIG. 3.

Figure 3:
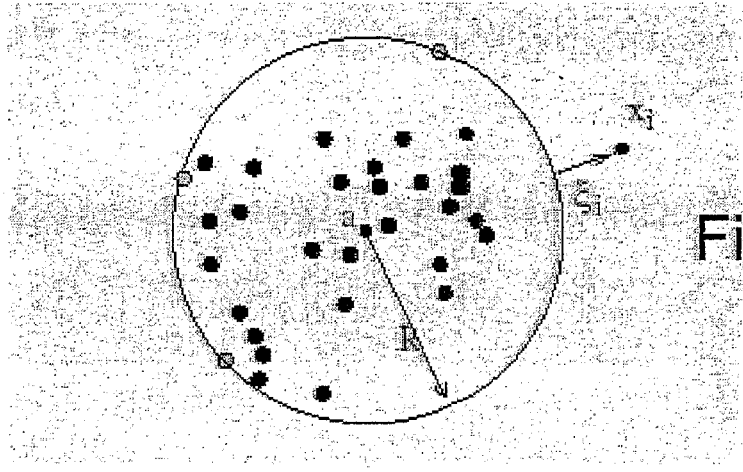
FIG. 3 shows a hypersphere containing training vectors, and support vectors in the high-dimensional feature space of a one-class SVM.

In particular, in FIG. 3 three objects are on the boundary of the hypersphere, and these three objects are the support vectors, while an object $x_i$ is outside the hypersphere since it has $\xi_i > 0$, where $\xi_i$ is a measure of the classification error (i.e. the difference between the distance from object $x_i$ to the center a and the radius of the hypersphere R).

Basically, the OC-SVM minimizes the structural error defined as:

$$E(R,a)=R^2$$

subject to the following constraint:

$$|x_i-a|^2 = R^2, \forall i$$

To allow the possibility of outliers in the training set, and therefore to make the method more robust, the distance from objects $x_i$ to the center a is not strictly smaller than $R^2$, but larger distances are penalized. This means that the empirical error is not zero, so slack variables $\xi$, $\xi_i > 0$, $\forall i$ are introduced and the minimization problem becomes:

$$E(R,a,\xi) = R^2 + C \cdot \Sigma_i \xi_i$$

with the constraint that almost all objects are within the following hypersphere:

$$|x_i-a|^2 = R^2 + \xi_i, \forall i$$

Parameter C gives the trade-off between the volume of the description and the errors. By introducing Lagrange multipliers and constructing the Lagrangian, the minimization of this error is a well-known quadratic programming problem, for which standard algorithms exist (reference may again be made to the above-referenced *One-class classification*).

By solving this problem the support vectors are obtained (which practically represent the object's reference model or template) together with the following expression for the center a of the hypersphere:

$$a = \sum_i \alpha_i x_i$$

As such, new objects are accepted by the description if the distance from the objects to the center a of the hypersphere is lower than or equal to the radius R.

Noteworthy issues related to OC-SVM are the training set construction, the SVM input data representation, and the SVM parameters tuning. Finding the right solution to these issues is a sine qua non condition for the success of the anomaly detection process.

The present invention proposes a particular choice of features and a training set construction method, an optimized representation of the input data and an automatic method for SVM parameter configuration.

Figure 4:
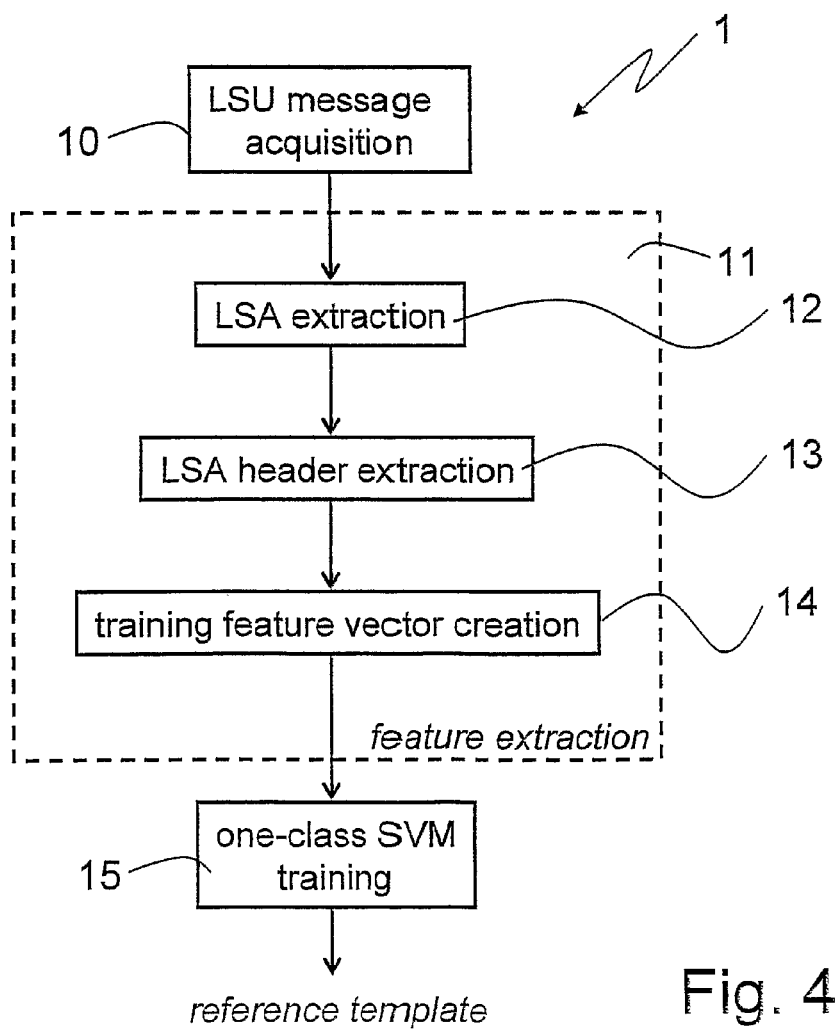
FIG. 4 shows a flow chart describing training of an one-class SVM according to an embodiment of the present invention.
Figure 5:
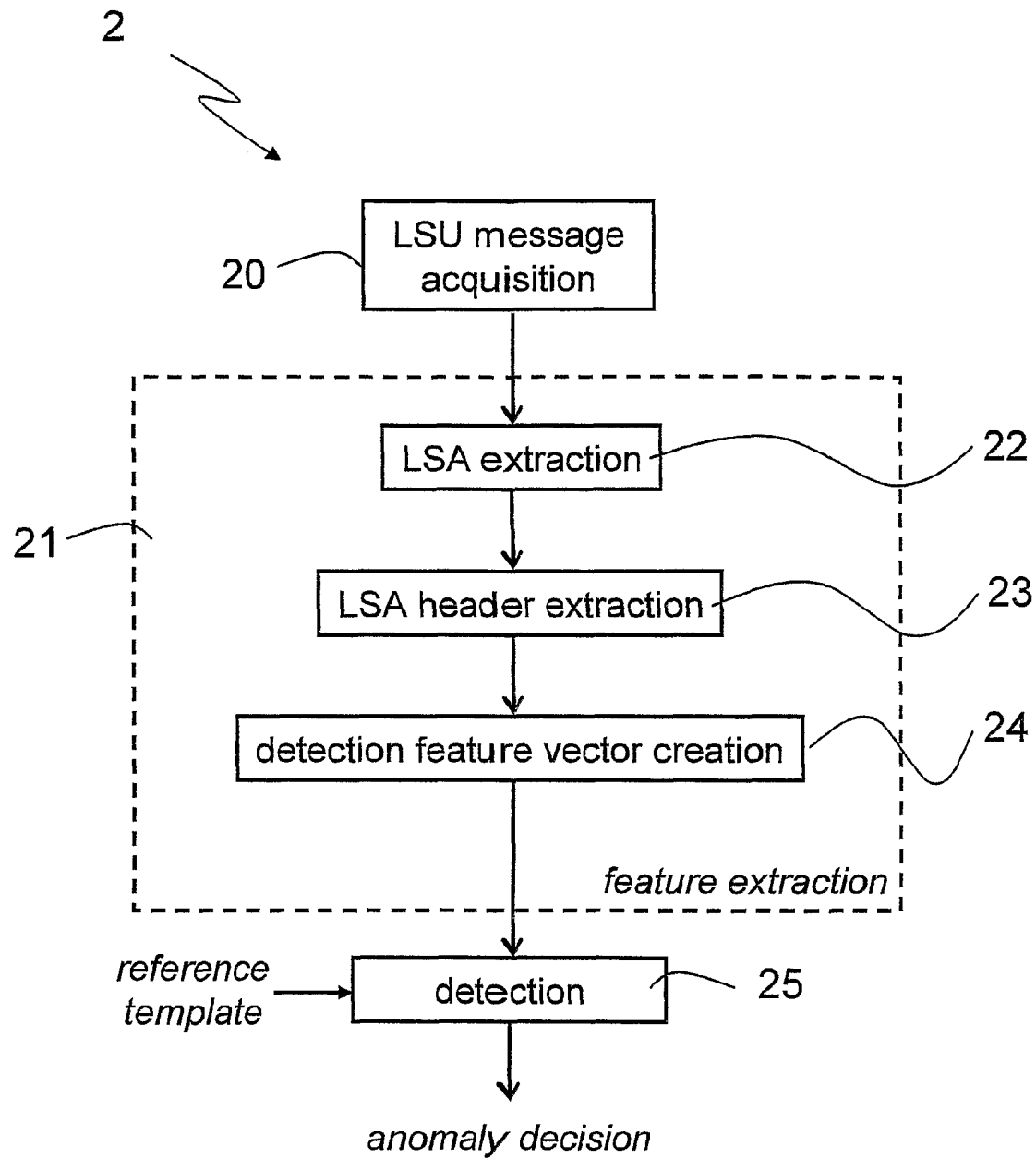
FIG. 5 shows a flow chart describing anomaly detection in an intra-routing domain according to an embodiment of the present invention.

Specifically, anomaly detection based on OC-SVMs comprises two phases showed in FIGS. 4 and 5: the OC-SVM training 1 and the anomaly detection 2, each comprising several steps.

According to FIG. 4, the OC-SVM training 1 comprises:
- data acquisition (collection) (block 10), i.e. acquisition of all LSU messages exchanged in the network during the free-of-attacks and free-of-failures training period only;
- feature extraction (block 11), in turn comprising:
  - LSA extraction (block 12),
  - LSA header extraction (block 13), and
  - serialization of the values extracted from the LSA headers, so forming the training feature vectors (block 14); and
- OC-SVM training (block 15), which results in the creation of a reference template for use in the anomaly detection phase 2.

In particular, SVM variables that need to be set are:
- the kernel function;
- the constant C;
- the training set size; and
- the support vector size.

The output of the OC-SVM training (block 15) is a reference template which comprises:
- the value of the parameter sigma of the kernel;
- the number of support vectors;
- the support vectors
- the weights (or α coefficients, also known as Lagrangian multipliers) of each support vector; and
- a detection threshold.

According to Applicant's experimentations, an REF kernel function has been used, which outperforms both sigmoid and polynomial kernels. The OC-SVM with an REF kernel represents a Gaussian radial basis function classifier that automatically produces all the information necessary for the reference template creation: the support vectors, their weights and the threshold.

Fundamentally, the value of the parameter sigma of the Gaussian RBF kernel used with the one-class SVM is estimated during the training phase 1, taking into consideration the actual training feature set. The computed sigma value becomes a part of the reference template, and is subsequently used during the anomaly detection (block 25).

Accurate tests have shown that the best value for the sigma parameter is equal to the average Euclidean distance between training feature vectors representing the normal behavior class. Other settings are possible, but this is the configuration that gives the best anomaly detection performance, since it represents the best trade-off between the false acceptance and false rejection error rates.

The value of the constant C is determined empirically for each type of feature set and represents the trade-off between the correct classification and the error rates.

Data acquisition (block 10) may be performed by collectors which are part of the network. Specifically, the collectors may be common network devices with their network interfaces in promiscuous mode, which receive all OSPF-related messages. They can also be routers.

In a possible embodiment of the present invention, the collectors may also carry out the LSA extraction (block 12)

and the LSA headers extraction (block 13). In this case, they select only LSA instances from OSPF traffic, eliminate the duplicates, extract and send the LSA headers to a common collection point responsible for the training feature vectors creation (block 14) and the OC-SVM training (block 15).

The proposed anomaly detection can work with different sets of features extracted from OSPF LSA instances. Even if hereinafter it will be described the use of some sets, other sets can be used, since the invention provides an automatic procedure for computing the necessary SVM parameters for each new type of feature set.

According to an embodiment of the present invention, training feature vectors contain twenty integer numbers representing the values of the twenty bytes composing the headers of the LSA instances observed in the modeled Autonomous System in normal operating conditions, i.e. during the substantially free-of-attack and free-of-failure training period. Hence, according to this embodiment, vectors containing twenty integer numbers, each with a value ranging from 0 to 255, are used.

It's important to note that according to this embodiment the values of the fields are considered as such in the composition of training feature vectors, therefore no time-consuming preprocessing is needed.

According to another embodiment of the present invention, the "LS Checksum" field is excluded, since it is considered less important for detection of anomalies and attacks. In fact this field depends on the values of the other fields. As a consequence, the training feature vectors, in this case, contain eighteen integers.

According to a further embodiment, each switching node inside the network can be provided with an own one-class SVM. Accordingly, the LSAs are slightly pre-processed, i.e. they are grouped per originating switching node.

Accordingly, all the LSAs originating from the same switching node form, the training feature vectors for this specific switching node, and contribute to the creation of the reference template of that switching node. Hence the number of reference templates is equal to the number of OSPF switching nodes. In this case, the training feature vectors include fourteen integers because the 4-byte "Advertising Router" field is also excluded from the template computation, since it is previously used for the LSAs selection (grouping). Also if this embodiment tends to be more time consuming, it yields better detection results especially if the number of switching nodes in the network is high.

According to the foregoing, OC-SVM training (block 15) results in the creation of the reference template, which characterizes the normal operating behavior of the OSPF routing in the modeled network. In particular, only positive examples of the network behavior are used for the training 1 of the one-class Support Vector Machine and these examples are the training feature vectors created during a substantially free-of-attacks and free-of-failures training period.

In particular, the OC-SVM computes or "learns" a function h which defines a hypersphere which encloses all the positive example's representing the normal class, while all other examples are not necessary for the complete definition of the hypersphere.

More particularly, the OC-SVM operates by mapping the training feature vectors into a high-dimensional feature space and by finding in the high-dimensional feature space a hypersphere that encompasses all the training feature vectors, the hypersphere having a given center, a given radius defining the detection threshold and a surface in the high-dimensional feature space defined by the support vectors.

The obtained support vectors together with some SVM specific parameters, such as the radius of the hypersphere, i.e. the detection threshold, the sigma value of the RBF kernel function, i.e. the variance of the kernel function of the OC-SVM, and the value of the constant C, form the reference template which represents the normal routing behavior of the network.

In case of each switching node inside the network provided with an own one-class SVM, each modeled switching node of the network has its own reference template.

According to FIG. 5, the anomaly detection phase 2 comprises:
  data acquisition (collection) (block 20), i.e. acquisition of all LSU messages exchanged in the network;
  feature extraction (block 21), in turn comprising:
    LSA extraction (block 22),
    LSA header extraction (block 23), and
    serialization of the values extracted from the LSA headers, so forming the detection feature vector (block 24); and
  anomaly detection (block 25) based on the detection feature vectors and reference template.

Moreover, an alarm together with an attached severity-level may also be issued.

After the feature extraction (block 21), the one-class SVM classification is applied on each detection feature vector composing the live set at a given moment in time, and the anomaly detection (block 25) is performed.

Specifically, the anomaly detection (block 25) consists in computing, for each detection feature vector representing a feature set, its distance from the center of the hypersphere computed during the training phase 1. If the distance is shorter than the detection threshold, i.e. the radius of the hypersphere, the actual detection feature vector is classified as belonging to the normal class. Otherwise an anomaly is detected and an alarm is issued.

Alternatively, the anomaly detection (block 25) may be implemented by means of a decision fusion scheme. In the simplest case, the fusion rule may be based on majority voting. A simple majority voting scheme includes:
  computing a distance between each detection feature vector and the center of the hypersphere in the high-dimensional feature space;
  detecting an anomaly if the number of detection feature vectors with a distance lower than the anomaly detection threshold in relation to the total number of detection feature vectors is lower than a given value.

Other fusion rules can be implemented if required. The severity of the alarm may be set directly proportional to the average distance between the detection feature vectors and the reference hypersphere.

The advantages of the present invention are clear from the foregoing. In particular, not only the training phase 1, but also the anomaly detection phase 2 is significantly simplified with one-class Support Vector Machines, since only one reference template per network or per switching node is used for the anomaly detection and not an arbitrary number of attack signatures as in the existing detection methods. Consequently, the anomaly detection according to the present invention is faster and its duration does not depend on the size of an additional database.

Additionally, all anomalies which alter the normal values of the fields of the link-state routing protocol messages exchanged inside a network are detected in real-time and in a reliable way. Such anomalies can either be due to attacks to the routing infrastructure or to errors and failure condition of the routing infrastructure. Such attacks can also be originated externally, for example coming from a router belonging to an external network.

The main attacks, which can result in anomalies in the network routing, are:

cross algorithm route hijacking, in which a Border Gateway Protocol (BGP) router announces reachability to prefixes it does not own nor is able to route to, thus black-holing the traffic to those prefixes; route hijacking is usually the result of misconfigurations, for example, a typo advertising the prefix 1.3.3.0/24 instead of 1.2.3.0/24, but it can be also malicious, employed as a form of DOS (Denial Of Service) attack;

resource consumption, in which a malicious router of the OSPF network injects fake routes (e.g. type 5 external routes) in a stateless way; working in a stateless manner, it can inject data without consuming its own resources, and, in the same time, filling the central unit of other nodes with trash; this attack will affect the weakest routers (i.e. the ones with less memory) and the nearest to the attacker first; when a router has no more room to store OSPF data, it cannot receive more updates; in the mean time, the OSPF process deletes good data when they are old, leaving the node with bad data only;

internal route hijacking, in which a router announces a route that is owned by another router; the attacker creates a so-called "attraction area", an area in which the cost of the network it announces is lower than the cost of the router owner; inside this area it attracts the packet addressed to the route, while outside the packets are routed correctly;

external route injection, in which a router announces a route that is not owned by any router of the (internal) network; normally the way selected for this route is the general one (i.e. the default route); if a specific network is injected in OSPF it is surely chosen by every router of the inside network, relying on the longest prefix match paradigm;

route leakage, when a misconfigured BGP router mistakenly sends a lot of routes to a peer with limited resources, which can completely melt down the peer router; in general BGP routers have fast interfaces and a lot of memory and CPU power, while OSPF ones can have fast or slow interfaces, much or few memory and fast or slow CPU, hence, if a BGP router redistributes all of its networks into OSPF some crash situation may occur; this happens also because BGP is a slow algorithm but able to transport a lot of data (millions of routes), while OSPF is extremely fast, but requires much data and large databases to do it, so it is not able to transport a large quantity of data as BGP; and OSPF insider attacks such as max-sequence, max age, sequence++, bogus LSA; these attacks try to subvert a route that is originated from a router of the network; the subversion could consist in deleting the route from the network (using the "premature aging" technique) or overwriting an information related to that route; the owner of the route will try, to re-establish the correct state (fight-back procedure), so the attacker subverts the router if, he/she sends more data than it; this makes the attack very noisy.

The described attacks are all correctly detected by the anomaly detection method according to the present invention.

Finally, it is clear that numerous modifications and variants can be made to the present invention, all falling within the scope of the invention, as defined in the appended claims.

In particular, it is again pointed out that the present invention may also be applied to any link-state routing protocol other than the aforementioned OSPF.

Moreover, in principle, anomaly detection may be based on machine learning approaches other than those previously described (one-class classifiers in general, and one-class Support Vector Machines in particular), such as neural networks or clustering algorithms, all based on the contents of the LSA headers.

The invention claimed is:

1. An anomaly detection method for link-state routing protocols, a link-state routing protocol providing for link-state update messages to be exchanged between nodes in a packet-based network, wherein each link-state update message includes link-state advertisement message(s) each having a respective header with a number of fields, the method comprising:

extracting and forming respective training feature vectors with values in at least some of the fields of the headers of at least some of the link-state advertisement messages exchanged in the network during a training period;

computing a hypersurface encompassing the training feature vectors, wherein the hypersurface comprises a center and a radius defining an anomaly detection threshold;

monitoring link-state advertisement messages exchanged in the network;

extracting and forming respective detection feature vectors with the values in at least some of the fields of the headers of at least some of the monitored link-state advertisement messages;

detecting an anomaly related to routing by comparing positions of the detection feature vectors to the hypersurface and feeding the detection feature vectors to a one-class support vector machine and;

training the one-class support vector machine during the training period based on the training feature vectors, wherein the training period is substantially free-of-attacks and free-of-failures, wherein the one-class support vector machine is based on a kernel function with a variance which is set substantially equal to an average Euclidean distance between the training feature vectors, and wherein the kernel function is a radial basis function, wherein the one-class support vector machine operates by mapping the training feature vectors into a high-dimensional feature space used to model the hypersurface, and wherein the one-class support vector machine includes support vectors defined by training feature vectors closest to the hypersurface;

wherein training the one-class support vector machine includes computing a reference template including the support vectors, the variance of the kernel function, and the center and radius of the one-class support vector machines, and representing a free-of-attacks and free-of-failures routing behaviour of the network; and wherein detecting an anomaly related to routing includes:
  detecting an anomaly related to routing based on the reference template and the detection feature vectors; and wherein detecting an anomaly related to routing based on the reference template and the detection feature vectors comprises:
  computing a distance between each detection feature vector and the center of the hypersurface in the high-dimensional feature space; and
  detecting an anomaly related to routing based on the computed distances.

2. The method of claim 1, wherein detecting an anomaly related to routing based on the computed distances includes:
detecting an anomaly related to routing if a computed distance is higher than the anomaly detection threshold.

3. The method of claim 1, wherein detecting an anomaly related to routing is based on a decision fusion scheme.

4. The method of claim 3, wherein the decision fusion scheme is based on majority voting.

5. The method according to claim 4, wherein majority voting includes:
computing a distance between each detection feature vector and the center of a hypersphere in the high-dimensional feature space; and
detecting an anomaly related to routing if a number of detection feature vectors with a distance lower than the anomaly detection threshold in relation to a total number of detection feature vectors is lower than a given value.

6. The method of claim 1, wherein the method is implemented by each node in the network.

7. An anomaly detection system for link-state routing protocols, a link-state routing protocol providing for link-state update messages to be exchanged between nodes in a packet-based network, wherein each link-state update message includes link-state advertisement message(s) each having a respective header with a number of fields, the anomaly detection system being configured to implement an anomaly detection method comprising:
extracting and forming respective training feature vectors with values in at least some of the fields of the headers of at least some of the link-state advertisement messages exchanged in the network during a training period;
computing a hypersurface encompassing the training feature vectors, wherein the hypersurface comprises a center and a radius defining an anomaly detection threshold;
monitoring link-state advertisement messages exchanged in the network;
extracting and forming respective detection feature vectors with the values in at least some of the fields of the headers of at least some of the monitored link-state advertisement messages;
detecting an anomaly related to routing by comparing positions of the detection feature vectors to the hypersurface and feeding the detection feature vectors to a one-class support vector machine and;
training the one-class support vector machine during the training period based on the training feature vectors, wherein the training period is substantially free-of-attacks and free-of-failures,
wherein the one-class support vector machine is based on a kernel function with a variance which is set substantially equal to an average Euclidean distance between the training feature vectors, and wherein the kernel function is a radial basis function,
wherein the one-class support vector machine operates by mapping the training feature vectors into a high-dimensional feature space used to model the hypersurface, and wherein the one-class support vector machine includes support vectors defined by training feature vectors closest to the hypersurface;
wherein training the one-class support vector machine includes computing a reference template including the support vectors, the variance of the kernel function, and the center and radius of the one-class support vector machines, and representing a free-of-attacks and free-of-failures routing behaviour of the network; and
wherein detecting an anomaly related to routing includes:
detecting an anomaly related to routing based on the reference template and the detection feature vectors; and
wherein detecting an anomaly related to routing based on the reference template and the detection feature vectors comprises:
computing a distance between each detection feature vector and the center of the hypersurface in the high-dimensional feature space; and
detecting an anomaly related to routing based on the computed distances.

8. A non-transitory computer readable memory having computer executable instructions stored thereon, which when executed by a processor perform an anomaly detection method for link-state routing protocols, a link-state routing protocol providing for link-state update messages to be exchanged between nodes in a packet-based network, wherein each link-state update message includes link-state advertisement message(s) each having a respective header with a number of fields, the method comprising:
extracting and forming respective training feature vectors with values in at least some of the fields of the headers of at least some of the link-state advertisement messages exchanged in the network during a training period;
computing a hypersurface encompassing the training feature vectors, wherein the hypersurface comprises a center and a radius defining an anomaly detection threshold;
monitoring link-state advertisement messages exchanged in the network;
extracting and forming respective detection feature vectors with the values in at least some of the fields of the headers of at least some of the monitored link-state advertisement messages;
detecting an anomaly related to routing by comparing positions of the detection feature vectors to the hypersurface and feeding the detection feature vectors to a one-class support vector machine and;
training the one-class support vector machine during the training period based on the training feature vectors, wherein the training period is substantially free-of-attacks and free-of-failures,
wherein the one-class support vector machine is based on a kernel function with a variance which is set substantially equal to an average Euclidean distance between the training feature vectors, and wherein the kernel function is a radial basis function,
wherein the one-class support vector machine operates by mapping the training feature vectors into a high-dimensional feature space used to model the hypersurface, and wherein the one-class support vector machine includes support vectors defined by training feature vectors closest to the hypersurface;
wherein training the one-class support vector machine includes computing a reference template including the support vectors, the variance of the kernel function, and the center and radius of the one-class support vector machines, and representing a free-of-attacks and free-of-failures routing behaviour of the network; and
wherein detecting an anomaly related to routing includes:
detecting an anomaly related to routing based on the reference template and the detection feature vectors; and wherein detecting an anomaly related to routing based on the reference template and the detection feature vectors comprises:
  computing a distance between each detection feature vector and the center of the hypersurface in the high-dimensional feature space; and
  detecting an anomaly related to routing based on the computed distances.

* * * * *